United States Patent

[11] 3,527,146

| [72] | Inventor | Richard A. Garling<br>Louisville, Kentucky |
|------|----------|-------|
| [21] | Appl. No. | 798,183 |
| [22] | Filed | Feb. 10, 1969 |
| [45] | Patented | Sept. 8, 1970 |
| [73] | Assignee | Porter Paint Company<br>Louisville, Kentucky<br>a corporation of Kentucky |

[54] NON-SKID TRAFFIC BEARING SURFACES
10 Claims, No Drawings

[52] U.S. Cl. .................................................. 94/5, 94/7, 94/22
[51] Int. Cl. ............................................... E01c 11/24
[50] Field of Search .................................. 94/5, 7, 22; 117/102, 167

[56] References Cited
UNITED STATES PATENTS

| 2,706,936 | 4/1955 | Willson .................... | 94/5 |
| 3,008,387 | 11/1961 | Wittenwyler ............. | 94/5X |
| 3,168,019 | 2/1965 | Lynn ........................ | 94/5 |

Primary Examiner—Nile C. Byers, Jr.
Attorney—Norman L. Wilson, Jr.

ABSTRACT: Non-skid coatings are now widely used in a variety of applications, the non-skid surfaces consisting of a film containing particles of a mineral aggregate such as sand. When the aggregate particles spall off they abrade, scratch and wear the friction surface. For use on vehicle and pedestrian traffic bearing surfaces a non-skid friction coating is provided in which the aggregate is not abrasive.

NON-SKID TRAFFIC BEARING SURFACES

BACKGROUND OF THE INVENTION

This invention in one of its aspects pertains to flooring compositions. In another of its aspects the invention relates to a method by which any traffic surface base may be provided which is non-skid in nature and which has high abrasion resistance.

Considerable effort has been directed in recent years toward the development of materials which can be applied to floors, treads, platforms, ramps, walks around swimming pools, roadways, bridges, and the like, in order to keep them from becoming dangerously slippery when wet. As a result of this effort, various compositions have been fabricated which form strong, non-skid coatings.

Non-skid coating compositions generally provide protective coverings having outstanding resistance properties. In addition the compositions usually contain a relatively large amount of inert aggregate. However, heretofore it has been deemed necessary to employ hard, abrasive particles as the aggregate. Thus in 2,925,831 aggregate of volcanic origin is used. Sand is suggested in 2,943,953. Aluminum oxide, silica, and other abrasives are disclosed in 3,360,391, 3,033,088, 2,948,201, and other patents.

One of the disadvantages of prior art non-skid materials is attributable to the hardness of the aggregates. Since aggregate particles are harder than the resin binder, when they spall off, they scratch, abrade, and wear the friction surface during subsequent usage. In addition such abrasive coatings are undesirable around swimming pools and in athletic change rooms where no shoes are worn.

SUMMARY OF THE INVENTION

In accordance with one of the embodiments of this invention a non-skid coating composition for use on vehicle and pedestrian traffic bearing surfaces is provided in which the aggregate is not abrasive. The composition hence is ideally suited for use in pool and shower areas as well as on ramps, grids, bridges, and the like. In another embodiment the invention provides a traffic bearing surface including a supporting base and an exposed non-skid abrasion resistant surface layer bonded thereto. As the bonding composition a resinous film-forming vehicle capable of ambient temperature hardening is employed. The aggregate in admixture with the bonding composition is not a mineral aggregate but rather an elastomeric polymer in the form of two mil to one-eighth inch solid rubbery particles.

DETAILED DESCRIPTION OF THE INVENTION

One of the advantages of this invention is that by providing an organic aggregate which is elastomeric a skid proof surface is provided in which the projecting aggregate particles are not readily broken out of the binder. In addition any aggregate which does spall off does not wear and abrade the surface of the coat formed by the resin binder. This is an outstanding advantage when compared over a long period of use with a non-skid finish containing abrasive aggregate particles.

Another advantage of the coatings of this invention is that due to the use of an elastomeric aggregate, by increasing the thickness of the finish coat, heavy rubber like films may be deposited which give a cushioned walking surface resistant to wear by foot traffic and rubber tire vehicles.

All of the known paint vehicles which harden at temperatures prevailing under conditions of use are suitable herein since it is well known that traffic and floor paints are suitable for use in non-skid coatings applications. Hence commonly used air-drying binders such as alkyd resins, varnish resins, drying oils, urethane oils, styrenated alkyds, epoxy esters, and acrylics can be used. In addition thermoset resins in which curing or cross-linking takes place at ambient temperatures, say, 50°F. to 100°F., can also be employed. Such materials are epoxide resins, phenol-formaldehyde resins, furanes, acrylics, and polyurethanes in combination with their known flexibilizing curing agents.

Some of the foregoing resins are liquid resins. However in most instances the vehicle containing these resins will include an organic solvent, the amount being 0 to 85 weight percent based on the resin. The particular vehicle solvent employed obviously will depend upon the binder solids. Thus if the binder reactants are soluble in an aliphatic solvent, it will be unnecessary to use a strong solvent such as an aromatic hydrocarbon or ketone. Hence for the binders contemplated, solvents will be selected from among the ketone, alcohol, hydrocarbon, nitroparaffin and ester solvents, depending on the solubility of the binder reactants. Examples are ethyl alcohol, butyl alcohol, amyl alcohol, ethyl acetate, amyl acetate, ethylene glycol monomethyl ether acetate, diethylene glycol monomethyl ether acetate, ethylene glycol, diethylene glycol, pentane, hexane, amylene, cyclohexane, benzene, toluene, xylene, petroleum ether, aliphatic petroleum naphtha, Stoddard solvent, mineral spirits, turpentine, aromatic petroleum naphtha, methyl ethyl ketone, methyl isobutyl ketone, nitroethane, and nitropropane.

Referring now more specifically to the binders, preferred vehicles are those containing either moisture or catalyst cured urethanes, for example, reaction products of tolylene diisocyanate, diphenyl methane diisocyanate, triphenyl methane diisocyanate, hexamethylene diisocyanate, bitolylene diisocyanate, and the like, with glycols, hydroxy polyesters and hydroxy polyethers to form polyurethanes which can be either air-dried, moisture cured, or cross-linked with amines, metallic catalysts such as organo-tin, hydroxy compounds, and phenol-aldehyde condensates. Other resins which can be included in the vehicle are condensation products of phenols and formaldehyde, such as the novolak resins, furfural-aldehyde resins, ketone-aldehyde condensates, particularly those cured with amines, urea, and melamine. Phenol-aldehyde resins heat processed with drying oils are also suitable.

Polyesters which can be used are esters of saturated alcohols and unsaturated acids, esters of unsaturated alcohols and saturated acids, as well as unsaturated halogen and nitrogen-containing acids or alcohols each having a single double bond. Examples are allyl, methallyl, crotyl, 1- —chloroallyl, 2—chloroallyl, cinnamyl, vinyl, methvinyl, 1- —phenylallyl, butenyl, etc., alcohol esters of saturated aliphatic and aromatic monobasic acids such, for example, as acetic, propionic, butyric, valeric, caproic, benzoic, phenylacetic, etc. acids. Included also are the saturated monohydric alcohol esters, e.g., the methyl, ethyl, propyl, isopropyl, butyl, sec-butyl, amyl, etc. esters of unsaturated aliphatic monobasic and polybasic acids, such as acrylic and alpha-substituted acrylic (including alkacrylic, e.g. methacrylic, ethacrylic, propacrylic, etc., and arylacrylic, e.g., phenylacrylic, etc.), crotonic, maleic, fumaric, citraconic, mesaconic, itaconic, aconitic, etc.

Polyamide resins such as the versamids and the vegetable oil modified polyamides can be used as well as epoxy resins. Epoxy resins within the contemplation of this invention are glycidyl polyethers of both polyhydric alcohols and polyhydric phenols, epoxidized fatty acids or drying oil acids, epoxidized diolefins, epoxidized di-unsaturated acid esters, as well as epoxidized unsaturated polyesters, so long as they contain, on the average, more than one epoxide group per molecule. The well known glycidyl polyethers of polyhydric phenols are made by the reaction of a polyhydric phenol with epihalohydrin or glycerol dihalohydrin, using a sufficient amount of a caustic alkali to combine with the halogen of the halohydrin. Products resulting from the dehydrohalogenation of these reaction products are monomeric or straight chain polymeric products characterized by the presence of more than one oxirane group, i.e., one,two-epoxy equivalency greater than one. The preparation of polyepoxides from polyhydric phenols and epihalohydrin is described in U.S. Pat. Nos. 2,467,171, 2,538,072, 2,582,985, 2,615,007, and 2,698,315, the proportion of the halohydrin (epichlorhydrin or glycerol dichlorhydrin) to dihydric phenol being at least about 1.2 to 1, up to around 10 to 1. In addition to polyepoxides made from alcohols or phenols and an epihalohydrin, polyepoxides made by the known peracid method are also suitable. Epoxides of unsaturated esters, polyesters, diolefins and the like can be prepared by reacting the unsaturated compound with a peracid.

Besides solvent systems it will be appreciated that aqueous emulsion vehicles can also be employed, for example, vinyl resin emulsions, polyvinyl acetate, acrylic ester copolymer emulsions, synthetic and natural latex, and the like. Examples are vinyl plastics such as polyvinyl chloride, polyvinyl acetate, vinyl chloride, polyvinyl acetals, vinyl acetate copolymers, monovinyl acetylene polymers such as the neoprenes, particularly neoprene AC and neoprene AD, styrene-butadiene and similar copolymers, chlorinated rubber, and butyl rubber. Some resins such as the polyesters, particularly the acrylate, methacrylate, and acrylic acid polymers and copolymers can be used in either solvent or emulsion systems.

Referring now to the aggregate materials, there are three desiderata in their selection. The vehicle must wet them sufficiently to adhere to them. They must be sized or be graded to a size larger than the film thickness unless broadcast, i.e., sprinkled or spread on the applied film. In addition they must not be soluble in the vehicle. Obviously any of the resins enumerated hereinbefore can be formed by casting, molding, grinding or otherwise shaping into spherical or irregular particles. However, preferred aggregate particles are particulate polyurethanes, cured vinyl plastisols for instance, polyvinyl chloride, polyvinylidine chloride, copolymers of vinyl chloride with other monomers such as vinyl acetate, vinyl butyrate, methyl acrylate, butyl methacrylate, styrene, dibutyl fumarate, vinyl phenyl ether and the like, vulcanized rubber, reclaimed rubber, polyethylene, nylon, Teflon, cured epoxy resins, polyesters, and commercial grades of rubber sold as rubber particles such as Hycar 1411. Desirable polyesters which can be employed are those made in either solvent or emulsion systems.

The invention will now be described in conjunction with typical formulations which will further exemplify the invention. These examples are for the purpose of illustration only since obviously various additives normally incorporated in coating compositions can be included in the formulations.

EXAMPLE 1

An aggregate composition is made by dry mixing 500 pounds of ground vulcanized rubber particles, 150 pounds of red iron oxide pigment, 50 pounds of titanium dioxide and 10 pounds of fine silica (Cab-O-Sil). The size of the rubber particles is such that 100 percent pass through a 35 mesh screen and 35 percent pass through an 80 mesh screen. To prepare a red non-skid paint 23 pounds of this aggregate and 80 pounds of a commercially available vehicle consisting of a moisture-curing urethane resin (tolylene diisocyanate — 80:20 ASTM-Type 2) are stirred in a mechanical mixer until thoroughly mixed and the mixture is homogeneous throughout. This coating composition, brushed on an outside wheel chair ramp where it is subjected to both wear and weathering, shows no signs of deterioration after several months.

EXAMPLE 2

Following Example 1 500 pounds of the rubber aggregate of Example 1 are mixed with 100 pounds of titanium dioxide, 100 pounds of chrome oxide pigment and 10 pounds of silica to make a green non-skid coating composition. Similar compositions are made in blue, gray and yellow using, respectively, phthalo blue, titanium dioxide and yellow iron oxide pigments. Test sections of these compositions on laboratory floors give no signs of spalling.

EXAMPLE 3

A rubber aggregate prepared by mixing 350 pounds of the ground vulcanized rubber with 200 pounds of titanium dioxide and 160 pounds of silica is mixed with the urethane resin vehicle, using 150 pounds of the aggregate and 400 pounds of the urethane vehicle. By spray coating, a film of this composition was applied to a metal loading ramp on which a towmotor could not be used during rain. No trouble is now encountered due to lack of wheel friction when the ramp is wet, and after use for over a month the coating shows very little wear even where the lifting arms rub across it.

EXAMPLE 4

Following Example 1 two pounds of the rubber aggregate of Example 3 are mixed with one gallon of an epoxy resin paint vehicle containing low molecular weight epoxy resins (weight per epoxide less than 900) modified with a plasticizer and cured with an aminoamid cross-linking agent. This composition, brushed on the floor in the manufacturing area of a paint plant, is wearing well.

EXAMPLE 5

Following Example 3 a non-skid coating composition is made using a hydroxy vinyl polymer-urethane emulsion. This composition is giving excellent results on application to concrete block.

EXAMPLE 6

Following Example 5 a coating composition is made using as the vehicle a chlorinated rubber floor coating (Porter 1100). A similar composition is made using an acrylic emulsion floor coating (Porter 1610). Test panels of both of these compositions show that the rubber aggregate is tightly bound and skid resistance is excellent.

EXAMPLE 7

In Example 6 when particles made by grinding up a cast plasticized polyvinyl chloride resin are substituted for the rubber aggregate similar results are obtained.

Whereas an aggregate is employed herein which will not scratch the surface of the film when particles of it break loose, it is understood that it can nevertheless still be harder than the film. However, it will not scratch the film because of its elastomeric nature. In one of its embodiments this invention involves employing aggregate and binder which are virtually matched in hardness properties. This is not to say that the aggregate and binder film have identical hardness values in a particular test. Rather by virtually matched is meant that the two are of the same order. Thus, considering Shore Durometer hardness, it is contemplated that the aggregate and binder film should be on the same hardness scale whether it is the B, the C, or the D scale. Many of the films will be on the D hardness scale. Therefore the aggregate preferably should be either softer or harder on that scale, rather than, say, on the B scale.

It is clear that the aggregate herein by virtue of its particle size extends above, that is, projects out of, the film surface. It is thus not a filler. It is also distinguishable from decorative particles in floor tile which are beneath the surface. It is understood also that many variations are possible within the spirit of this invention. Thus specific combinations of aggregate and binder can be formulated with or without pigmentation for special uses. For instance where non-flammability is desired a vinyl chloride resin binder can be used with neoprene or halo-substituted resin such as chlorinated polyethylene. Mixtures of aggregate materials such as rubber and vinyl plastics will frequently be desirable. In addition the compositions can be so formulated that they can be applied by spray coating, brushing, troweling, or flow coating. Film thickness will vary from two mils to one-eighth inch. Various primers can be used with the films.

It can be seen that by the practice of this invention a non-skid coating is provided herein in which the aggregate particles which project above the film surface flex and yield to foot and wheel traffic and consequently are not broken out of the binder. This is particularly evident when the film is sand blasted. A test film of the composition of Example 3 which had been applied to a wood base was to be removed by sand blasting. However, because of the flex and yield, sand blasting did not remove the film. A similar film containing sand was readily removed by sand blasting. An outstanding friction coating therefore is provided by this invention for floors, walks, streets, and the like as well as for undercoats of vehicles subjected to gravel impact.

I claim:

1. A traffic bearing surface comprising a supporting base and an exposed non-skid abrasion-resistant surface layer bonded thereto comprising particles of aggregate and a resinous film-forming vehicle capable of ambient temperature hardening, some of the said particles being embedded in and surrounded by said composition and other of said particles being exposed at the surface of said composition, the aggregate being an elastomeric polymer in the form of two mil to about one-eighth inch solid rubbery particles.

2. The surface of claim 1 wherein the elastomeric aggregate particles are larger on the average than the thickness of the applied film.

3. As a non-skid abrasion-resistant coating composition for use on vehicular and pedestrian traffic bearing surfaces a resinous film-forming vehicle capable of ambient temperature hardening containing as the aggregate in admixture therewith an elastomeric polymer in the form of two mil to about one-eighth inch solid rubbery particles present in an amount sufficient to confer the non-skid properties on the composition.

4. The composition of claim 3 wherein the elastomeric aggregate particles are larger on the average than the thickness of the applied film.

5. The composition of claim 3 wherein the elastomeric particles are not so hard as to scratch the applied resinous film.

6. The composition of claim 3 wherein the hardness of the elastomeric particles virtually matches the hardness of the applied resinous film.

7. The composition of claim 3 wherein the aggregate is a mixture of vulcanized rubber and a vinyl plastic.

8. The composition of claim 3 wherein the resinous film-forming composition is a thermosetting epoxy resin and a curing agent therefor and wherein the elastomeric particles are polytetrafluoroethylene.

9. The composition of claim 3 wherein the resinous film-forming composition is polyurethane and wherein the elastomeric particles are ground, sized, vulcanized rubber.

10. A method of providing a pavement having a non-skid exposed surface bonded to a supporting pavement base comprising the steps of spreading over said base a resinous film-forming vehicle capable of ambient temperature hardening and thereafter spreading over said film as an aggregate an elastomeric polymer in the form of two mil to about one-eighth inch solid rubbery particles in an amount sufficient to confer the non-skid properties on the composition.